March 28, 1961  P. M. CUNNINGHAM  2,977,585
ISO-ECHO CIRCUIT
Filed Jan. 25, 1957

INVENTOR.
PAUL M. CUNNINGHAM
BY
ATTORNEYS

United States Patent Office 2,977,585
Patented Mar. 28, 1961

2,977,585

ISO-ECHO CIRCUIT

Paul M. Cunningham, Irving, Tex., assignor to Collins Radio Company, Cedar Rapids, Iowa, a corporation of Iowa Filed Jan. 25, 1957, Ser. No. 636,297

4 Claims. (Cl. 343—5)

This invention relates generally to iso-echo control circuits for weather radar. Such control circuits enable violent atmospheric turbulence to be more easily distinguishable from moderate turbulence on a radar scope.

Weather radar can indicate the position of certain types of weather conditions, including turbulent areas. Such radar is particularly useful on aircraft; since aircraft must avoid places having great turbulence, which are primarily found in thunderstorms.

The intensity of radar pulses reflected from different parts of a cloud formation vary with the precipitation found therein. Thus, the strongest return pulses are reflected from places having the greatest precipitation. The return pulses are received in groups resembling noise, and the intensity of the envelope of each group varies with the precipitation in that area. The envelope is detected and translated into a display on a plan-position indicator; and conventionally, the brightest portions of the display indicate the areas of greatest precipitation. Since moderate or slight precipitation areas also appear as light grey areas on the scope, it is generally very difficult to distinguish between areas of moderate and extreme precipitation. It is the rapid change of precipitation in a short distance that signifies a very turbulent area. Therefore, very dangerous weather areas may not be sufficiently accentuated on the display scope to attract the attention of an observer because the grey-color variations are not sufficiently distinguishable to make obvious a large gradient change.

The invention enables the extremely turbulent areas to be more readily observable on the screen of a cathode ray tube. This is done by making the moderately reflective areas appear as varying grey colored areas on the screen, and by making the extreme reflective areas appear as black holes in the white areas. Existing turbulent areas are most likely adjacent to a black hole and are indicated by a large color transition in grey tones in a short distance on the scope. Thus, a quick color transition shown by a thin white edge adjacent to a black hole indicates an areas of great turbulence; and a slow color transition or thick white or grey edge indicates low turbulence. As a result, the extremely turbulent areas are apparent.

It is, therefore, an object of this invention to provide an iso-echo circuit that permits violently turbulent areas to be more readily distinguishable from lesser turbulent weather areas.

It is another object of this invention to provide an iso-echo circuit which is simple to construct and economical to reproduce.

The invention includes amplification and clipping means which are connected to a common terminal that provides information detected by a weather radar. The amplification means has a pair of inputs. One input receives undistorted detected pulse envelopes from the common terminal; and the other input receives only the peak portions of the same pulse envelopes from the clipping means, when the signal is above an adjustable threshold level. The threshold level is set to a voltage that distinguishes between moderate and large amounts of precipitation. The clipped input is provided with a greater amplitude factor than the undistorted input by providing prior gain for the clipped input or by attenuating the unclipped input, or both. The attenuation method is used in the detailed embodiment herein, but it is understood that the other ways are feasible, although they generally require more amplifiers.

The amplifier means provides a subtraction in its output, wherein the clipped pulses which substantially exceed the threshold level more than cancel their unclipped pulses. However, due to the tapered characteristic of the envelope of pulse returns caused at the edges of the precipitation area, each unclipped envelope has a longer duration than its clipped counterpart. Therefore, initial and final portions of the unclipped pulse envelope are not canceled and appear on the scope as a white perimeter that surrounds the canceled portion, which appears as a black area. When the input signal is below the threshold level, the invention does not affect the weather display on the scope.

Further objects, features and advantages of this invention will be apparent to a person skilled in the art upon further study of the specification and the drawings, in which.

Figure 1A:
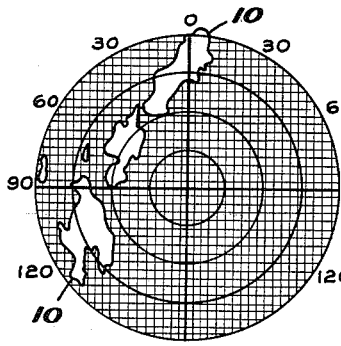
Figures 1A and 1B illustrate displays on the scope of a weather radar unit.

Figure 1A illustrates a weather display on the plan-position indicator of a weather radar set without using the invention. White portions 10 illustrate various precipitation areas. However, the different amounts of precipitation within the white areas are not immediately distinguishable, because they are represented as varying degrees of white. Turbulence which is dependent upon the precipitation and its change (gradient) in a particular area is not readily apparent. The precipitation intensity is observed by variation in the shades of grey on the scope. Such variations cannot be illustrated in Figures 1A and 1B.

Accordingly, there may be portions in and about the white areas which are extremely turbulent, and other portions which are only moderately turbulent. It may be necessary for a pilot to fly through turbulent regions, since he may have no other course. It is, therefore, essential for him to avoid the extremely turbulent areas, which could be disastrous.

Figure 1B:
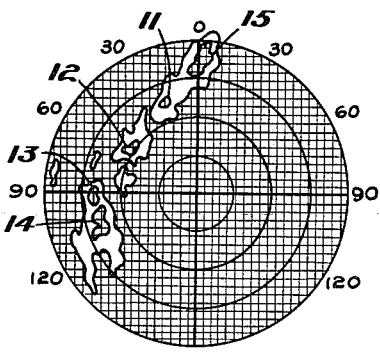

Figure 1B illustrates how the display is changed when using this invention. The extremely precipitating areas are made apparent by appearing as black holes within the white region, such as, for example, black holes 11, 12, 13, 14 and 15 in Figure 1B. The outline of the black holes is a contour line and the outline of the white area is another contour line. Turbulence will generally increase as they become closer. In this manner, the areas which must be avoided become more apparent to the pilot. The black holes of extreme precipitation set-off the contours so that they are more obvious and can be more accurately interpreted.

Generally, those dense precipitation areas that are relatively far apart on the scope presentation, such as holes 11 and 15 in Figure 1B, indicate only a moderate precipitation gradient and are separated by areas of only moderate turbulence. However, where the precipitation areas are close together, as between holes 13 and 14, or where a white area becomes narrow, such as along the left side of hole 11, a steep gradient is indicated which indicates a turbulent area. The pilot will, accordingly, select the most opportune area to fly his aircraft.

Figure 2:
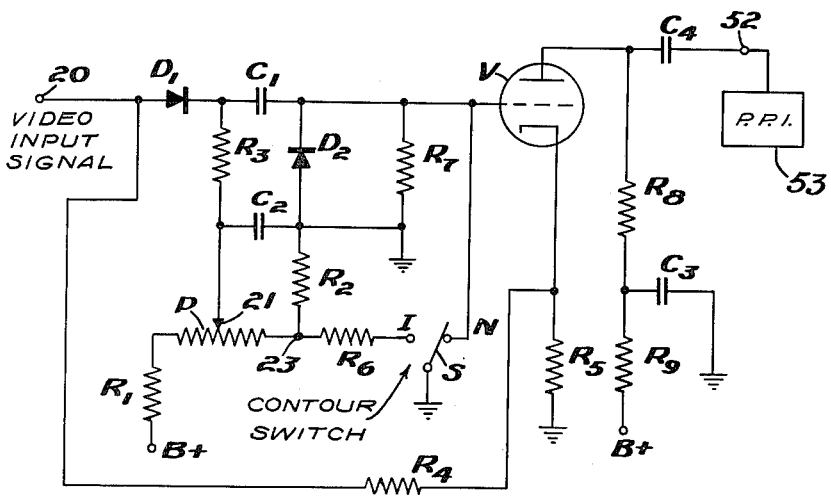
Figure 2 is a schematic diagram of a form of the invention.

Figure 2 illustrates a schematic diagram of a form of the invention, wherein a terminal 20 receives detected weather-radar pulses, which are obtained by well-known techniques; wherein transmitted pulses are reflected from a precipitation area and appear like an increase in noise from the area. It is the envelope of such a group of noise pulses that indicates a precipitation area.

The signal is received at the anode of a diode $D_1$, which has its cathode biased to a positive direct-voltage level. The bias is obtained from the tap 21 of a potentiometer P, which is in a voltage divider network including resistors $R_1$ and $R_2$ connected between a B plus supply voltage and ground. A resistor $R_3$ connects tap 21 to the cathode of diode $D_1$.

The signal does not pass through diode $D_1$ unless it is above the threshold level set by the potentiometer tap. When the signal is above the threshold level it is passed to the grid of an amplifier tube V through a blocking capacitor $C_1$. Resistor $R_3$ is made compatible with the diode characteristics to provide sharp clipping action. Capacitor $C_2$ decouples the B plus supply from the signal passed by the diode.

Tube V acts as a grounded-cathode amplifier in regard to signal received from diode $D_1$, and this signal component appears in its plate circuit with reversed phase.

The cathode of tube V simultaneously receives the signal through an attenuating divider network comprising resistors $R_4$ and $R_5$.

Tube V acts as a grounded-grid amplifier in so far as its cathode-received signal is concerned, which appears on its plate in phase with the received signal at terminal 20.

A single-pole double-throw contour switch S has one terminal I connected through a resistor $R_6$ to the ungrounded end 23 of resistor $R_2$ on the voltage-divider network. The opposite switch terminal N is connected to the grid of tube V, and the pole of the switch is connected to ground. Resistor $R_6$ is only a fraction of the value of resistor $R_2$ so that when switch S engages terminal I, the bias voltage at tap 21 is lower than when switch S is at terminal N. This action sets the bias level of diode $D_1$ to a high value, exceeding the maximum possible input pulse level, when the iso-echo feature is not to be employed, so that operation is then similar to conventional radar operation.

A grid-leak resistor $R_7$ is connected between ground and the grid of tube V; and a diode $D_2$ has its anode connected to ground and its cathode connected to the grid of tube V. Diode $D_2$ clamps the signal coupled through capacitor $C_1$ so that the signal applied to the grid of tube V always has positive polarity. The time constant of $C_1$—$R_7$ is chosen so that their charge-discharge cycle follows the envelope of a group of pulses reflected from a precipitation area, wherein the clipped portion of the envelope increases the conduction of tube V and lowers its plate voltage.

Resistor $R_5$ also acts as the cathode-biasing resistor of tube V. Resistors $R_8$ and $R_9$ are serially connected between the plate of tube V and the B plus supply voltage and provide its plate load. Capacitor $C_3$ is connected between these resistors and ground to decouple signal from the B plus supply.

A plan-position indicator 52, of the type shown in Figures 1A and B, is connected to the plate of tube V through a blocking capacitor $C_4$.

When the iso-echo feature is not required, switch S can be positioned to terminal N. In this case, the grid of tube V is directly connected to ground, and no clipped signal can then be applied to the grid of tube V, which then acts as a pure amplifier to provide an undistorted signal output at terminal 52.

Figure 3:
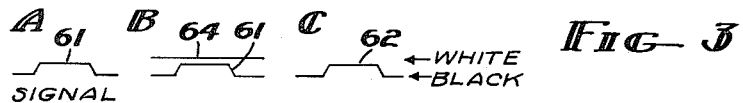
Figures 3 and 4 illustrate wave-forms that are used in explaining the operation of the invention.
Figure 4:
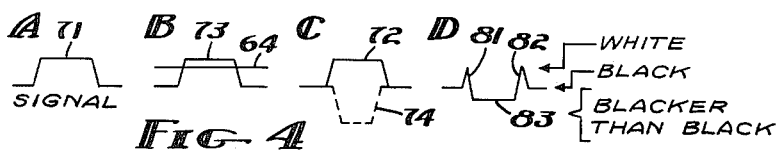

With switch S at iso-echo position I, the operation of the invention may be explained by assuming two types of pulse-return envelopes. Figure 3 illustrates how the invention operates with a relatively low-amplitude pulse envelope received from a moderate precipitation area. On the other hand, Figure 4 illustrates how the invention operates with a relatively high-amplitude pulse envelope received from a heavy precipitation area.

Pulse 61 in Figure 3A represents an envelope of detected radar pulses received from an area of low to moderate precipitation and provided at terminal 20. This is below the threshold-bias setting 64 of diode $D_1$ in Figure 3B; and, accordingly, no part of pulse 61 passes through diode $D_1$ to tube V. However, pulse 61 is received with undistorted form, although attenuated, at the cathode of tube V; and it, therefore, appears at output terminal 52 as an undistorted amplified version of the low-amplitude pulse envelope received at input terminal 20 and having the same polarity. Such pulses vary into the grey and white-level regions of cathode-ray-tube actuation.

It is, therefore, realized when an input pulse is below the threshold-level setting of potentiometer P, the pulse causes a white or grey indication on the screen of the weather-radar scope.

On the other hand, when a relatively large-amplitude pulse envelope is received at input terminal 20, as shown by pulse 71 in Figure 4A, the output shown in Figure 4D results when switch S engages contact I. Pulse envelope 71 has a portion above threshold setting 64, in Figure 4B, which is passed through diode $D_1$ to the grid of tube V. The clipped peak of the pulse has its phase inverted in tube V and appears in amplified form in its plate circuit, as illustrated by pulse 74 in Figure 4C.

Simultaneously, the unclipped pulse 71 is attenuated, but is not distorted by resistor $R_4$ to actuate the cathode of tube V. It appears in the plate circuit as pulse 72 in Figure 4C and does not have its phase inverted.

The net output of tube V provided at output terminal 52 is shown in Figure 4D as a result of adding the opposite polarity pulses 72 and 74 in the plate circuit of tube V. The duration of clipped pulse 74 is less than the duration of its unclipped pulse 72, due to pulse taper caused by the rise and fall time of the pulse envelope. Consequently, the output variation at terminal 52 includes two positive-going pulses 81 and 82 enclosing a negative-going pulse 83; wherein the positive-going pulses extend toward the white-video region and the negative-going portion extends into the blacker-than-black video region. Therefore, a pulse envelope received from a heavy precipitation area causes, on a weather-radar scope, a black area bordered on both sides by white areas due to bordering-envelope pulses 81 and 82. As signal pulses 81 and 82 become shorter in duration, a larger gradient is indicated and vice versa, to assist in interpreting the degree of turbulence associated with the precipitation.

Thus, in Figure 1B, the white portions about black holes 11 through 15 are caused by pulses 81 and 82 as they are scanned over the scope.

Although this invention has been described with respect to a particular embodiment thereof, it is not to be so limited as changes and modifications may be made therein which are within the full intended scope of the invention as defined by the appended claims.

I claim:

1. An iso-echo circuit for weather radar comprising an electron tube having at least a cathode, a plate and a control grid, an input terminal for receiving information detected by said weather radar, an output terminal connected to the plate of the tube, an attenuating network connected between said input terminal and the cathode of said electron tube, a clipping circuit connected between said input terminal and the grid of said tube, direct-current biasing means connected to said clipping means to adjust its positive clipping level, and a plan-position indicator of said radar having the intensity of its scanning beam modulated by the output of said iso-echo circuit being connected with the output terminal of said tube.

2. An iso-echo circuit having an input terminal for receiving detected weather-radar information, an amplifier tube including at least a cathode, a plate and a control grid, an output terminal connected with a plate of the tube, with said control grid providing a phase inversion with respect to the output of said amplifier, a diode having its anode connected to said input terminal, a blocking capacitor connected between the cathode of said diode and said control grid, a voltage divider, resistance means connecting a point on said voltage divider to the cathode of said diode to control its biasing level, a second diode having its anode connected to ground and its cathode connected to said control grid, attenuating means connected between said input terminal and the cathode of said tube, and switching means for connecting and disconnecting said voltage divider to control the operation of said circuit, and means connected to the output terminal for displaying said output.

3. An iso-echo circuit comprising an electron tube, including a plate, a control grid and a cathode, a cathode resistor connected between ground and the cathode of said tube, an output terminal connected with the plate of the tube, an input terminal, an attenuating resistor connected between said input terminal and the cathode of said tube, a first diode having its anode connected to said input terminal, a blocking capacitor connected between the cathode of said first diode and the grid of said tube, a voltage divider connected serially between ground and a B plus voltage source, a potentiometer included within said voltage divider, a resistor connected between the tap of said potentiometer and the cathode of said diode, a second diode having its anode connected to ground and its cathode connected to the grid of said tube, a grid leak resistor connected between ground and the grid of said tube, and means connected with the output terminal of the electron tube for displaying the output of said iso-echo circuit.

4. An iso-echo circuit as defined in claim 3 having a double-throw switch with its pole connected to ground, and having one contact connected to said control grid, said voltage divider including a fixed resistor serially connected with said potentiometer, a resistor having one end connected to the opposite contact of said switch, and the other end of said resistor being connected to the juncture of the potentiometer and said fixed resistor of said voltage divider.

References Cited in the file of this patent
UNITED STATES PATENTS

| | | |
|---|---|---|
| 2,420,374 | Houghton | May 13, 1947 |
| 2,434,937 | Labin et al. | Jan. 27, 1948 |
| 2,623,998 | Emanuelsson | Dec. 30, 1952 |
| 2,646,502 | Bell | July 21, 1953 |
| 2,786,993 | Reid | Mar. 26, 1957 |